March 3, 1936.　　　A. B. CLARK　　　2,032,401
COLOR PHOTOGRAPHY
Filed Sept. 4, 1931　　　4 Sheets-Sheet 1
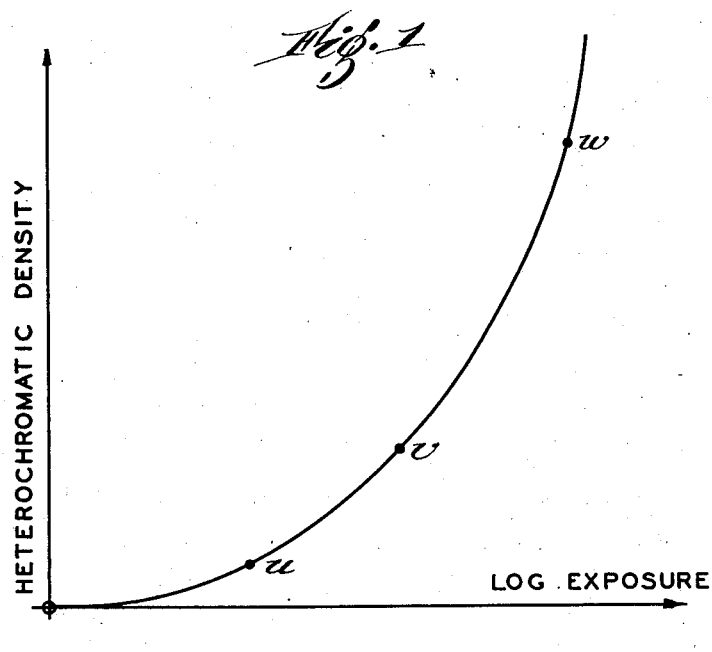
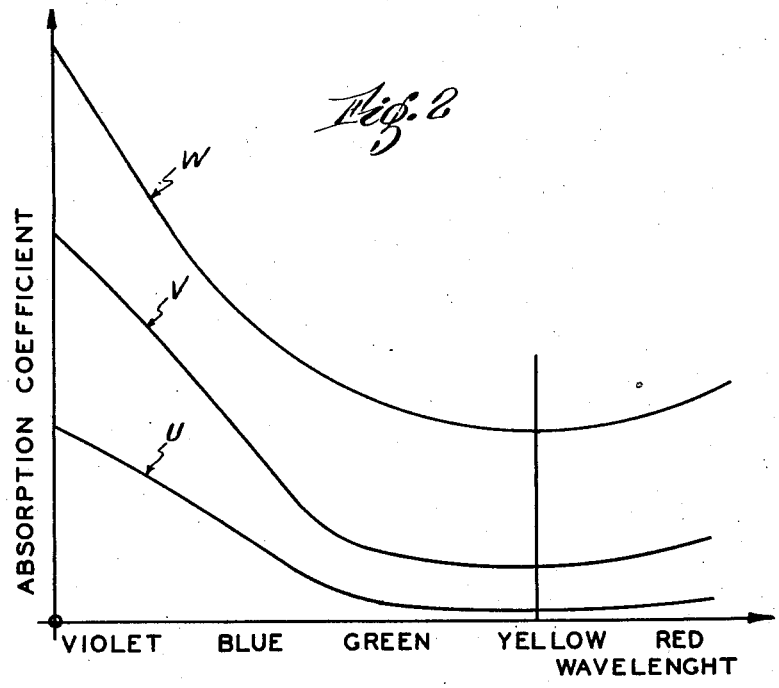
INVENTOR
ARTHUR BISSELL CLARK
By Roberts Cushman + Woodberry
HIS ATTORNEYS.

March 3, 1936.　　　A. B. CLARK　　　2,032,401
COLOR PHOTOGRAPHY
Filed Sept. 4, 1931　　　4 Sheets-Sheet 2

Fig. 3

| NEGATIVES TAKEN THROUGH FILTER | BLUE | GREEN | RED |
|---|---|---|---|
| REPRODUCED IN | YELLOW | MAGENTA | CYAN |

Fig. 4

| POSITIVE RECORD | PRINTED FROM NEGATIVE RECORD | | |
|---|---|---|---|
| | BLUE | GREEN | RED |
| YELLOW | PRINCIPAL | AUXILIARY | AUXILIARY |
| MAGENTA | AUXILIARY | PRINCIPAL | AUXILIARY |
| CYAN | AUXILIARY | AUXILIARY | PRINCIPAL |

Fig. 5

| POSITIVE | MADE FROM NEGATIVE RECORD | | |
|---|---|---|---|
| | BLUE | GREEN | RED |
| BLUE | PRINCIPAL | AUXILIARY | AUXILIARY |
| GREEN | AUXILIARY | PRINCIPAL | AUXILIARY |
| RED | AUXILIARY | AUXILIARY | PRINCIPAL |

Fig. 6

INVENTOR
ARTHUR BISSELL CLARK
BY
HIS ATTORNEYS

March 3, 1936.  A. B. CLARK  2,032,401
COLOR PHOTOGRAPHY
Filed Sept. 4, 1931  4 Sheets-Sheet 4
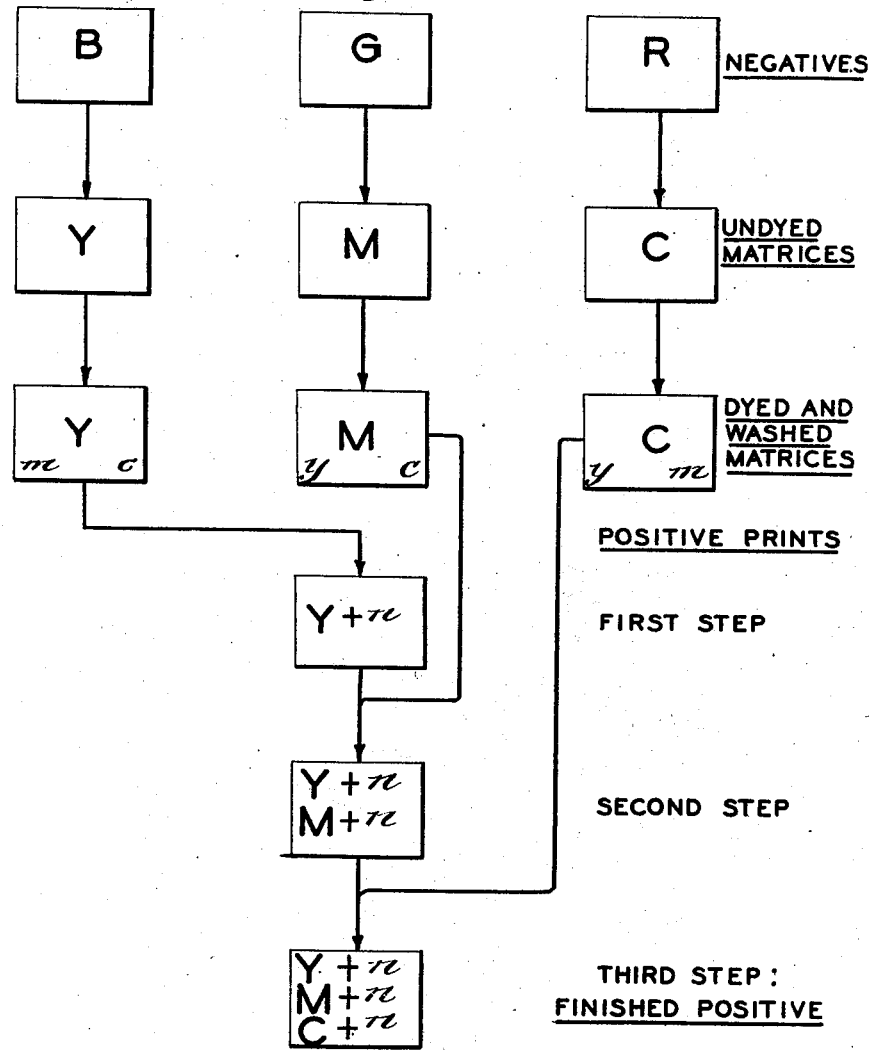
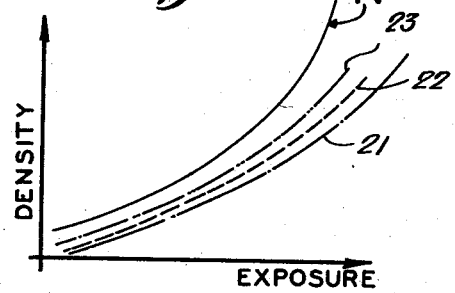
INVENTOR
ARTHUR BISSELL CLARK
HIS ATTORNEY Patented Mar. 3, 1936

2,032,401

UNITED STATES PATENT OFFICE 2,032,401

COLOR PHOTOGRAPHY

Arthur Bissell Clark, Newton Center, Mass., assignor, by mesne assignments, to Technicolor, Inc., New York, N. Y., a corporation of Delaware Application September 4, 1931, Serial No. 561,098

45 Claims. (Cl. 95—2)

It is well known in the photographic art that light and shade contrasts as perceived by the human eye from projected, transparent or paper pictures in most cases do not correspond to the actual physically measurable contrasts of the transparent or opaque record from which the visual image originates. There are many reasons for this phenomenon, the most important of these reasons being stray light between the record and the eye, imperfections of the record surface, and imperfections of optical surfaces, as for instance of lenses for projecting a picture. Color photographs as well as black and white photographs are influenced by these factors. In color photography, the factors referred to above not only tend to decrease the visual light and shade contrasts but in addition these and other factors falsify the correct reproduction of the colors of the object. Such other factors include imperfections of the taking filters, especially overlap of these taking filters, imperfections of projection filters or imperfections of the dyes used for making the positive pictures, and especially the impossibility of obtaining dyes which come reasonably close to being theoretically correct complementary colors to the colors of the taking filters. In order to create from a reproduction a physiological sensation which comes as near as possible to that which would be produced by the original object field itself, it is necessary to compensate for these detrimental influences.

In order to correct the degradation of the light and shade contrasts of colored photographs, apart from the color sensation itself, several means have been proposed. Generally speaking, these means have the purpose of making the curve which represents the density—log exposure relation (characterizing one or all steps of a particular photographic process), concave upwardly instead of essentially straight as would theoretically correspond to correct reproduction. Particularly for color reproductions making use of dye transfer processess such means have been disclosed and claimed in Patent No. 1,804,727 of May 12, 1931, to E. D. Weaver.

The result of such measures is to add effective exposure to the heavier densities, in other words to make the grays darker, thereby compensating for the above described factors influencing the physiological sensation caused by the photographic reproduction of a scene, as far as light and shade contrasts, apart from color, are concerned. These means of changing the characteristic curve are quite satisfactory in black and white photography and they even correct to some extent the falsification of color reproduction. However, the peculiarities of color separation photography make the full use of the upwardly concave curve for each partial color reproduction, produced by photographic means, not entirely satisfactory. It is of course quite possible to print in the higher densities enough color from each positive color printing element to obtain sufficiently dark grays, but this has the inevitable effect of making the contrasts in the not altogether gray or black portions quite unnatural, due to the fact that the observer recognizes errors of color contrast much more readily than errors of black and white contrast. This difficulty has long been recognized in color process printing and it is quite customary in lithography, half-tone color printing, intaglio and offset color printing, etc., to use black or gray key prints which obviously effect increased contrasts in the higher densities without seriously influencing the colors.

The present invention relates to a new method of eliminating the various detrimental influences discussed, and is particularly adaptable to requirements of modern color photography and cinematography. Some of its principal objects are to provide photographic color separation reproductions which cause natural visual sensations and avoid the defects inherent in sensations derived from color reproductions which are theoretically correct but take no account of physiological and psychological color vision phenomena; and which afford increased black and white contrasts with decreased color contrasts to provide such reproductions with the aid of pure color auxiliary positives and/or black auxiliary prints; to provide subtractive imbibition positives from three negatives, which have the desirable properties of positives with key prints, without actually making a key print and without adding steps to the ordinary three color process; controlling at will the characteristic curves of the partial prints as well as of the complete reproduction of color separation photographs; and the elimination of errors inherent in the various steps of color separation photography by correcting at will the character of the partial color reproductions.

These and other objects of the invention will be apparent from the following description which refers to drawings in which:

Fig. 1 is a density curve, with heterochromatic densities plotted over log exposures;

Fig. 2 is a series of absorption curves for various densities of the curve of Fig. 1;

Figs. 3, 4 and 5 are tables explaining the principle of the invention;

Fig. 6 shows the absorption and emission curves of foliage;

Fig. 8 shows exposure-density curves of a final print according to the invention and of its color components; and Fig. 9 is a diagram of the various steps of an embodiment of the invention.

Figure 7:
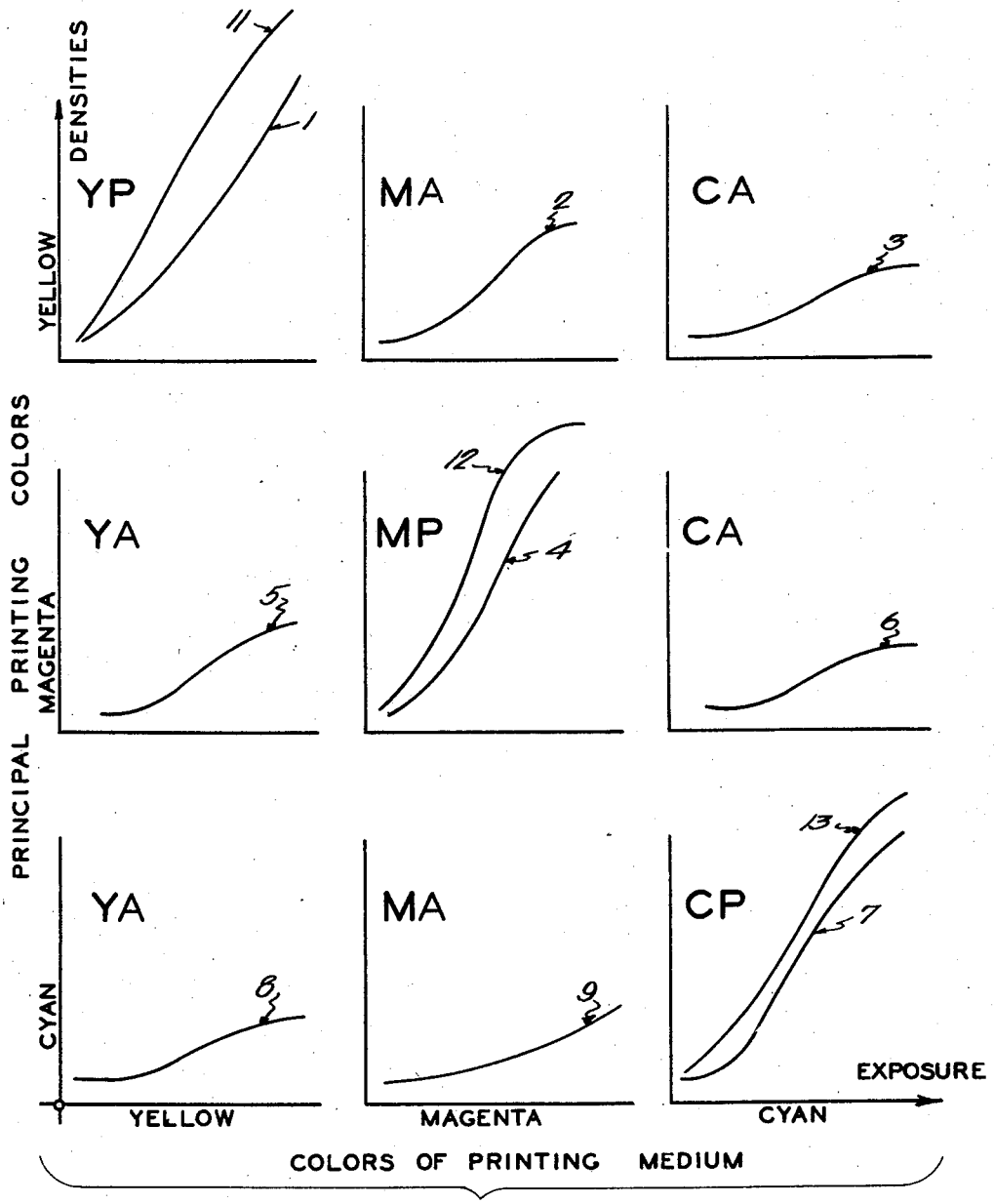
Fig. 7 is a series of exposure-density curves illustrating a modification of the invention.

The invention will first be described in its broader aspects, and a specific embodiment thereof will then be disclosed in order to make the description more comprehensible.

In the following description and in the claims, various terms commonly used in the art of color photography are employed, some of which will be mentioned in the following general discussion of color separation photography in order to clarify their meaning as herein understood. In the art of photography in substantially natural colors, by means of color separation, certain taking colors are selected (for example by means of taking filters each of which transmits light within a certain range of wave lengths), corresponding to the color aspects of the recorded images. These color aspects cover the wave length ranges which correspond to the hues of certain fundamental colors and are photographically recorded as negative color aspect images or records or color aspect negatives (for instance blue, green and red color aspect negatives or color separation negatives). By suitable means, these negatives are converted into positive records shortly called positives, referred to also as color separation positives, color aspect positives or partial positives, which are then superposed or otherwise combined either directly by additive or substractive projection or viewing, or they may be used for making positive reproductions therefrom, the reproductions of the partial or color separation positives being combined to form complete color reproductions or complete positives in approximately natural hues. Permanent reproductions are usually called prints, which are made from the positives or positive printing (positive color separation) elements in certain printing colors which are coordinated with the taking colors. In the case of additive reproduction the printing or reproduction colors are substantially similar to the taking colors and in subtractive reproduction they are complementary thereto.

In its broader aspects, the invention involves means for adding, to the portions of certain selected densities of positive color records, a controlled amount of exposure from other records. In terms of spectrophotometry, the invention consists in controlling the operation and/or dyes so that the same color at different densities is in the final reproduction represented by different absorption curves, the absorption curves for greater densities showing a relatively higher absorption in the spectral region where the absorption is least.

For example, taking the curve of Fig. 1 which is the density-log exposure curve for yellow of a color reproduction according to the invention, $u$, $v$ and $w$ signifying three points of low, middle and high densities, the absorption curves corresponding to these densities, of the yellow component of the complete positive, have an approximate shape as shown in Fig. 2, which gives three absorption curves U, V, W corresponding to the three densities $u$, $v$, $w$ of Fig. 1. In Fig. 2, the absorption coefficients of the yellow component are plotted over the wave lengths. Fig. 2 shows that curve W, corresponding to a high density, is comparatively flatter than V, and still flatter than U, which signifies the fact that the higher densities have relatively more black than the lower densities. The effect of this variation is to increase the ratio of black to color in the print as the density is progressively increased, that is, as the densities of any color are increased, the color contains more black instead of becoming more strongly colored. The picture therefore has with increasing density relatively more black and relatively less color than pictures made by the conventional methods. Assuming for example that in a certain positive picture a particular hue predominates, the predominating hue obviously would be over-compensated if, according to known methods, the density-exposure curves of each positive color printing element are made upwardly concave in order to increase the black and white contrast in the higher densities; that is, the hues of the higher densities would lean in an unnatural manner towards this predominant hue. Assuming a subtractive reproduction process and the spectral ranges of the taking colors and color filters and of the corresponding printing mediums to be the fundamental colors blue, green, red, and yellow (blue absorbing), magenta (green absorbing), cyan (red absorbing), respectively, (without connecting any narrowly defined spectral ranges with these terms) if the magenta of a subtractive color aspect positive (corresponding to a negative recording the green color aspect) predominates, the ordinary technique over-compensates the magenta and the whole positive appears which more magenta than the original object, that is the reds are too blue and the blues too red.

According to the present invention, positive reproductions or prints (to be referred to herein as principal reproductions or prints) are, as usually, made from each color separation record of a fundamental color aspect, in colors appropriately coordinated with the respective color separation negatives. In addition thereto, auxiliary positive reproductions or prints are made, either by adding a black print, or prints, or by superposing prints in colors used for making principal reproductions from color separation positives other than those from which the particular auxiliary reproduction is made, or by combining both methods, namely, auxiliary color reproductions and auxiliary black reproductions. Any of these modifications will attain the peculiar relation of color and black which is the general object of the invention. For example, by using auxiliary color reproductions in a subtractive three-color process, again assuming filter and reproduction colors as above, principal and auxiliary prints are made from positive printing elements (as e. g. printing matrices) as indicated by the table Figs. 3 and 4, whereas the corresponding procedure for a three-color additive process is indicated by table Fig. 5. If the auxiliary prints cover for example substantially only the higher density ranges, the contrasts in the higher densities of the final positive reproduction are increased without danger of over-compensation of a particular record due to the shape of the curve. In the instance referred to before, a light print from the magenta printing element is added in cyan to the regular cyan print and in yellow to the regular yellow print. The characteristic curve of the magenta, as well as the other records, has the theoretically correct straight shape and no unbalance of color is possible, whereas the additional prints will combine to give black in the higher densities and in this manner furnish the desired increased contrast in these densities, the effect being similar to that of a black and white key print printed, in this example, from the green record. If the characteristic curves are more or less upwardly concave, the over-compensation of the magenta print is balanced by the equally predominant additional prints in cyan and yellow from the magenta printing element. The additional prints, in magenta and cyan from the yellow printing element, and in magenta and yellow from the cyan printing element, will not predominate in this particular example; these other additional prints are accordingly light and will produce an increased black and white contrast but not change the proper color balance. No matter what the shape of the curves may be, the final print will have the heavier portions of the magenta print overlaid with coextensive yellow and cyan compensation prints from the magenta printing element, which together constitute a black image covering the area which needs an effective increase of black. Furthermore, the color contrasts are reduced in the higher densities where they are naturally more apparent than elsewhere and therefore unfavorably recognized by the human eye as mentioned before. In this particular example the positive magenta, which would be visually dominant in the higher densities quite apart from the shape of the characteristic curves, will be overlaid in these portions by yellow and cyan components which have been adjusted to balance the dominant magenta, the total effect being an effective reduction of apparent color and an effective increase of black in the areas needing these adjustments. The final result is correct color rendition together with a desirably increased black and white contrast.

It will be understood by those skilled in the art, that a similar result can be obtained by using, as alluded to above, an auxiliary black print or black prints (of the peculiar nature according to the invention, and not to be confused with the well-known key prints), instead of auxiliary color prints, and that modifications employing one auxiliary black print, or auxiliary color and black prints combined, can be used in all cases where the relation between color and black is about the same for all colors. But where only one, or two colors are involved, either the modification with auxiliary color reproductions must be used, or an auxiliary black reproduction for each color involved (or a single black reproduction composed of these auxiliary black reproductions) or a combination of auxiliary color reproductions with auxiliary black reproductions.

It is also quite easy with the method according to the present invention to correct certain defects, as for example over or under exposure of one or several of the color separation negatives. Such defects may be partly corrected by variation of the negative development, but this introduces an unbalanced factor into the contrasts of that negative. Such irregularities can be corrected much more easily, and practically perfect, by making suitable adjusted additional printings according to this invention. For example, it is quite obvious that natural greens, particularly plants as trees and lawn, should always be represented in a green negative record by heavy silver deposits and in the red and blue negatives by little or no silver, according to the particular natural hue of the green which may lean somewhat toward the red or blue. However, due to the chlorophyll content of plants, chlorophyll being red fluorescent, the red record will be abnormally heavy. The curve E of Fig. 6 shows the absorption and curve F the red fluorescent emission of foliage green. This red fluorescent light is not ordinarily visible, being of too long a wave length, but it does affect the ordinary panchromatic negative emulsion and the same is true of the red light normally transmitted by chlorophyll. In order to correct this defect it is not feasible to make a heavier cyan positive print because this would unbalance the whole picture while correcting the greens. According to this invention, more yellow than usual is printed (from the blue negative record) onto the positive. Since the blue negative record contains the correct reproduction of the lights and shades of the foliage, these foliage greens are correctly reproduced and not with the objectionable brownish hue often recognizable in three-color reproductions of trees and similar objects.

It will be obvious to any one skilled in the art that the new method is applicable to any color separation process, including for example two or four color subtractive processes and two and four color additive processes.

Fig. 7 of the drawings further explains the invention as applied to a subtractive three-color process with auxiliary color prints. It shows the conventional density-exposure curves for each of the prints of actually manufactured positives, the densities being plotted over the logarithms of the exposures. The letters Y, M, and C denote the colors yellow, magenta, cyan, and the letters P and A mean "principal" and "auxiliary", signifying the nature of each particular print. It will be seen that the curves 2, 3, 5, 6, 8, 9 for the auxiliary prints cover substantially only the upper exposure ranges of the principal prints corresponding to curves 1, 4, 7. The curves 11, 12 and 13 show the amount of the yellow, magenta and cyan colors respectively in the resulting record. Although the curves 11, 12 and 13 should be theoretically sums of curves 1, 5, 8; 2, 4, 9 and 3, 6, 7 respectively, they are slightly flatter, because there is invariably some loss of dye intensity due to the printing process.

Generally speaking, the new principle can be applied to any color process whatsoever and, if the printings are suitably controlled, will produce the best possible color pictures since it permits adjustment of any factor involved. This is clearly indicated by Fig. 7. The curves corresponding to the auxiliary prints can be moved by appropriate methods into any desired relation to the main curve; and their shape may also be varied so that any defect of the main curves can be appropriately corrected. For example, the effect of a color reproduction can be changed beyond the limit of the taking filters by adding to the lower densities of each partial color positive the colors of each other partial positive. In this case the high neutral contrast will be in the lower density portions of the curve and the shadows will be very brilliant due to the high color contrasts. In certain cases such effects of over emphasizing the colors in the shadow portions and of increasing the neutral contrasts in the high light portions are desirable for artistic reasons.

The following description refers to one of the possible embodiments of the invention which is especially applicable to making color positives by dye-transfer from matrices, the so-called imbibition process.

If an imbibition matrix, either flat or relief, is dyed with a mixture of dyes of different solubility or affinity for the gelatin of the matrix, appropriate treatment which in most cases will consist in a more or less prolonged washing, will remove the dyes from the matrix to a different degree. For example one dye will not be removed at all or only to the same slight degree over the whole matrix, whereas another dye of the mixture will be washed out from the lighter parts of the matrix to a much higher ratio than from the darker parts. If the dyes are of different colors the relief and the transfer print made therefrom will be selectively colored, depending on the properties and colors of the dyes. This principle provides a very simple and effective means for making imbibition transfer prints according to the present invention. It is merely necessary to add to the principal dye solutions for each record a controlled amount of easily washable dyes of the colors of the two other records. After washing out these dyes from the lower densities, each washed matrix will appear darkened in the heavy densities by the three dyes combining to black, to a degree which can be controlled by choosing appropriate dyes, by adjusting the washing operation, by using an appropriate kind of gelatin for the matrix or by other means which may lend themselves for this purpose. The final print made from the matrices will have the qualities described in the course of the general discussion of the invention. Each of the matrices can be controlled in a different manner, for instance each of the dyes of one color may have different properties, each matrix may have a different characteristic and may be treated differently after having been soaked in the dye mixture, and therefore any defect of the matrices or of the whole process can be effectively corrected. In carrying out this embodiment of the invention I produce, for instance from negatives taken according to Patent No. 1,889,030 to J. A. Ball, by J. A. Ball, three gelatin relief matrices according to the process disclosed in United States Patent No. 1,535,700, to L. T. Troland. The magenta matrix, made from a green negative, is dyed with a mixture of 100 parts Light Fast Cardinal Red C (Color Index #278) to 2 parts of Metanil Yellow (C. I. #138) and one part of Pontacyl Green SN (C. I. #737) for about two minutes, then washed in water of 90° C. for about one-half minute and the remaining dye contents transferred to a suitable blank by imbibition. The whole dyeing and transfer process is preferably carried out on a machine as disclosed in United States Patent No. 1,661,157 to J. A. Ball et al. The cyan matrix, made from the red negative, is dyed in a mixture of 100 parts of Fast Acid Green B (C. I. #667) to 2 parts of Acid Magenta BN (C. I. #30) to 2 parts of Metanil Yellow, and the yellow matrix made from the blue negative in a mixture of 100 parts of Anthracene Yellow GR (C. I. #195) to 5 parts of Acid Magenta BN and 1 parts of Pontacyl Green SN for about two minutes, the cyan matrix being washed for one minute in water of 90°, and the yellow matrix in water of 70° for one-half minute. The transfers from the three matrices are printed on the transfer film as indicated above. Instead of using these dyes I have found that other suitable dyes, as for example, Pontamine Pink BL (C. I. #353), Brilliant Yellow (C. I. #364), Acid Magenta S (C. I. #692), Cyanol FF (C. I. #715), Pontacyl Green B (C. I. #666) and Wool Orange A (C. I. #151) may be substituted for Light Fast Cardinal Red, Anthracene Yellow, Acid Magenta BN, Pontacyl Green SN, Fast Acid Green B and Metanil Yellow, respectively. It is of course understood that appropriate amounts of these, or other, substitute dyes must be used, which will vary from the amounts given above.

Fig. 8 which is arranged similar to Fig. 7 shows the characteristic curves of a final positive as composed from the partial characteristics, 21, 22, 23 corresponding to the three colors of the various dyes used in the above described embodiment, and in addition the curve N of the black and white contrasts, of a finished transfer print made according to this embodiment. The curve shows the desirable characteristics of the print as to black and white contrasts and color contrasts. The curves 21, 22, 23 of Fig. 8 are for practical purposes identical with curves 11, 12, 13 of Fig. 7. Curves 2, 3, 5, 6, 8, 9 of Fig. 7 also show how the auxiliary color prints which combine with each other, and with the principal prints, to a black and white image of peculiar corrective properties, can be replaced by black prints, or one combination black print performing the same function.

Fig. 9 is a schematic showing of the printing process as described above and indicates the various steps of the described embodiment. From negatives B, G and R taken through blue, green and red filters, matrices Y, M and C are made for printing with yellow, magenta and cyan dyes. These matrices are soaked in the appropriate dyes, each having then incorporated a principal printing dye as indicated with capital letters, and auxiliary dyes as indicated with small letters. From these matrices, the final positive is printed in three steps, as indicated by appropriate arrows, $n$ indicating the auxiliary dyes for the black print.

In the special case referred to above, when it is desired to correct a negative, e. g. the rendition of foliage, more washable cyan dye than usual is added to the yellow printing element dye mixture. If it is desired to increase the color contrasts in the shadows, as also described above, non-washable dyes instead of washable dyes are used as additional dyes. These dyes will then increase the black and white contrasts in the lower density portions and the color contrasts in the high density portions, as will be readily understood from the preceding explanations.

It will be understood by any one skilled in the art, that the invention is applicable not only to positive printing processes utilizing gelatin relief matrices, but that any desirable matrix, flat or relief, may be used, which can be differentially colored, e. g. which takes up different amounts of coloring matter according to a record photographically imparted to the matrix. It is furthermore obvious, and the appended claims are intended to cover such modifications, that the principle of the invention can be applied to all reproduction processes as e. g. those using dyed up gelatin positives, or positives which are colored by chemical toning, mordanting, etc., or by combinations of these and/or previously mentioned well known processes.

It is furthermore understood, that for certain corrective purposes any number and/or combination of auxiliary reproductions or prints may be used instead of twice the number of principal reproductions as described by way of example. Such modified combinations, which render the new reproduction method extremely flexible, and adaptable for all practical requirements, will suggest themselves to the skilled photographer or printer who is familiar with the principles of the invention as herein described, and it is expressly understood that the present disclosure is for the purpose of illustration only and that this invention includes all modifications and equivalents which fall within the scope of the appended claims.

I claim:

1. In color photography the method of making complete positives by superposing colored part positives made from color separation negatives, comprising the step of controlling the density-exposure curves of each part positive and therefore of the complete positive by adding to said part positives auxiliary part positives made from at least one of said negatives in colors corresponding to another negative, the density-exposure curves of said part positives and respective auxiliary positives converging towards an extreme of said curves.

2. The method of making photographs in colors which comprises taking fundamental color separation negatives, making therefrom without substantial change of photographic values positive printing elements, superposing from the elements principal prints in colors complementary to the taking colors, and auxiliary prints substantially in principal printing colors of other elements and covering substantially only a portion of the density range of said principal prints adjacent one extreme of said range.

3. The method of making photographs in colors which comprises taking color separation negatives, making therefrom without substantial change of photographic values positive printing elements, superposing from each element prints in colors complementary to the taking color of the respective negative according to certain density-exposure relations and prints in other positive printing colors according to other density-exposure relations which are steeper towards an extreme thereof than the density exposure relations of said first mentioned prints.

4. The method of making photographs in colors which comprises taking color separation negatives, making therefrom without substantial change of photographic values positive printing elements, superposing from each element prints in colors complementary to the taking colors of the respective negatives and covering the entire density range of the negatives according to certain density-exposure relations, and prints in other positive printing colors covering only portions of the density ranges according to other density-exposure relations which are steeper towards an extreme thereof than the density exposure relations of said first mentioned prints.

5. The method of making photographs in colors which comprises the taking of color separation negatives recording the fundamental color aspects, making therefrom without substantial change of photographic values positive printing elements and printing from the elements superposed principal prints in colors complementary to their respective taking colors and auxiliary prints in colors complementary to other taking colors the density-exposure curves of said principal prints and of said auxiliary prints converging towards an extreme of said curves.

6. The method of making photographs in colors which comprises the taking of color separation negatives recording the red, blue and green aspects respectively, making positive elements therefrom and printing from these elements in cyan, yellow and magenta respectively over the entire density ranges, and printing from each element at least in one other color over a part of the density ranges substantially adjacent to an extreme of said ranges.

7. The method of making photographs in colors which comprises the taking of color separation negatives recording the red, blue and green aspects respectively, making positive elements therefrom and superposing from these elements principal prints in cyan, yellow and magenta respectively according to certain density-exposure relations and a print from one element in the color of another principal element, according to other density-exposure relations which are steeper towards an extreme thereof than the density-exposure relations of said principal prints.

8. The method of making photographs in colors which comprises the taking of color separation negatives recording the red, blue and green aspects respectively, making positive elements therefrom and superposing from these elements principal prints in cyan, yellow and magenta respectively over their entire density ranges, and a print from one element in the color of another principal element, covering only parts of the density ranges substantially adjacent to an extreme thereof.

9. The method of making photographs in colors which comprises taking two color separation negatives recording the spectral ranges of lower and higher wave lengths respectively, making therefrom without substantial change of photographic values positive printing elements superposing from said elements principal prints in colors complementary to the taking colors and auxiliary prints in the printing color of the other element, the principal and auxiliary prints covering corresponding density ranges according to density-exposure relations substantially converging towards an extreme of said relations.

10. The method of making photographs in colors which comprises making color separation negatives, making positive elements therefrom and additively superposing from the positive elements complete reproductions in the corresponding taking colors and auxiliary reproductions in the taking colors of other elements, said auxiliary reproductions covering only densities substantially adjacent to an extreme of the density range of said complete reproductions.

11. The method of making photographs in colors which comprises making color separation negatives, making positive elements therefrom and additively superposing from the positive elements principal reproductions in the corresponding taking colors and auxiliary reproductions in the colors of the other elements, the principal and auxiliary reproductions covering their density ranges according to different density-exposure relations substantially converging towards an extreme thereof.

12. The method of making photographs in colors which comprises taking color separation negatives, making gelatin positives therefrom, differentially coloring said positives complementary to the respective taking colors, and coloring the positives in colors complementary to other taking colors and covering only densities substantially adjacent to an extreme of the density range of said negatives.

13. The method of making photographs in colors which comprises taking color separation negatives, making gelatin positives therefrom, differentially coloring the positives complementary to the respective taking colors, coloring the positives in colors complementary to other taking colors in density ranges substantially adjacent an extreme of the density range of said negatives and transferring the color contents of the positives to a printing blank.

14. The method of making photographs in colors which comprises taking color separation negatives, making gelatin relief positives therefrom, dyeing the positives with dyes of colors complementary to the respective taking colors, dyeing density ranges of the positives, substantially adjacent an extreme of the density range of said negatives, with auxiliary dyes of colors complementary to other taking colors, and transferring the dye contents of the reliefs to a printing blank.

15. The method of making photographs in colors which comprises taking color separation negatives, making positive gelatin matrices therefrom, applying to each matrix a dye of a color complementary to the respective taking color of the corresponding negative and to at least one matrix an auxiliary dye of a color complementary to the taking color of another negative, and removing said auxiliary dye from portions of said matrix representing densities substantially adjacent to a maximum of the density range of said negatives.

16. The method of making photographs in colors which comprises taking color separation negatives, making positive gelatin matrices therefrom, applying to each matrix a dye of a color complementary to the respective taking color of the corresponding negative and auxiliary dyes of colors complementary to the taking colors of other negatives, removing at least part of said auxiliary dyes from portions of said matrix representing densities substantially adjacent to a maximum of the density range of said negatives and printing from the matrices by means of imbibition.

17. The method of making photographs in colors which comprises taking color separation negatives, making positive gelatin matrices therefrom, dyeing the matrices according to certain density-exposure relations with dyes having colors complementary to the respective taking colors, dyeing the matrices with auxiliary dyes according to different density-exposure relations substantially converging towards an extreme of said first named relations, in colors complementary to other taking colors, and in superposition transferring the dye contents of the matrices to a printing blank.

18. The method of making photographs in colors which comprises taking color separation negatives, making positive gelatin matrices therefrom, coloring the entire density ranges of the matrices in colors complementary to the taking colors, coloring at least one of the matrices in at least one auxiliary color complementary to a taking color of other matrices, and removing the auxiliary coloring matter from portions of at least one of said matrices representing densities substantially adjacent to a maximum of the density range.

19. The method of making photographs in colors which comprises taking color separation negatives, making gelatin relief positives therefrom, coloring the entire density ranges of the positives in colors complementary to the taking colors, coloring the positives in auxiliary colors complementary to taking colors of other reliefs, removing the auxiliary coloring matter from portions representing densities substantially adjacent a maximum of said range and transferring the color contents of the positives to a printing blank.

20. The method of photographing in colors which comprises making positive gelatin relief matrices from color separation negatives, soaking the matrix made from the blue negative in a solution containing Anthracene Yellow, Acid Magenta and Pontacyl Green, soaking the matrix made from the green negative in a solution containing Cardinal Red, Metanil Yellow and Pontacyl Green, soaking the matrix made from the red negative in a solution containing Fast Acid Green, Acid Magenta, and Metanil Yellow, washing the matrices in water substantially of room temperature until the Acid Magenta, Pontacyl Green, and Metanil Yellow are substantially removed from the lower density regions of the matrices, and transferring the dye contents of the matrices in register to a printing blank.

21. A photographic reproduction in colors having in the higher density ranges substantially adjacent to the extreme density different contrast characteristics of the neutral and colored portions respectively than in the lower densities.

22. A photographic reproduction in colors having in the lower density ranges substantially adjacent to the extreme density, different contrast characteristics of the neutral and colored portions respectively than in the higher densities.

23. A photographic reproduction in colors comprising in a carrier principal images in fundamental colors, each image covering its entire exposure range, and at least one auxiliary image in a fundamental color covering a different exposure range substantially adjacent an extreme of said entire range.

24. A photographic reproduction in colors comprising in a carrier images in magenta, yellow and cyan, each covering the entire exposure range of the particular color aspect, and auxiliary images in these colors covering a different range substantially adjacent to an extreme of said entire range.

25. A photographic reproduction in colors comprising in a carrier principal images in magenta, yellow and cyan, each covering the entire exposure range of the particular color aspect, and at least one auxiliary image in one of these colors covering a different range, the principal and auxiliary images having different density-exposure relations substantially converging towards an extreme of said entire range.

26. A photographic reproduction in colors comprising in a gelatin carrier superposed imbibition images of Fast Acid Green, Light Fast Cardinal Red, Anthracene Yellow, Pontacyl Green, Acid Magenta, and Metanil Yellow.

27. A photographic reproduction in colors comprising superposed principal color aspect images printed with Fast Acid Green, Light Fast Cardinal Red and Anthracene Yellow, and auxiliary images printed with Pontacyl Green, Acid Magenta and Metanil Yellow.

28. A photographic reproduction in colors comprising superposed principal color aspect images printed with Fast Acid Green, Light Fast Cardinal Red and Anthracene Yellow, and auxiliary images printed with Pontacyl Green, Acid Magenta and Metanil Yellow, the auxiliary images covering only parts of the density ranges of the principal images.

29. A photographic reproduction in colors comprising an imbibition layer containing superposed dye records in fundamental colors covering the entire density ranges of the records and dye records also in fundamental colors covering parts of the density ranges substantially adjacent to an extreme of said entire range.

30. A photographic reproduction in colors comprising an imbibition layer containing superposed dye records in fundamental colors, said records having certain exposure-density relations and auxiliary records also in fundamental colors having different exposure-density relations substantially converging towards an extreme of said first named relations.

31. A photographic reproduction in colors comprising superposed complete color aspect images in fundamental colors and auxiliary records substantially in the same fundamental colors representing substantially only portions of said images in the extreme density regions thereof.

32. A photographic reproduction in colors comprising superposed dye records in fundamental colors and according to a certain density-exposure relation, and similar auxiliary dye records substantially in the same fundamental colors but according to different density exposure relations converging towards an extreme of said first named relation.

33. A photographic reproduction in colors comprising an imbibition layer containing superposed principal dye records in magenta, yellow and cyan and auxiliary records in the same colors but representing different images according to density exposure relations different from, and converging towards extremes of, the density exposure relations of said principal records.

34. A photographic reproduction in colors comprising an imbibition layer containing superposed dye records in magenta, yellow and cyan and auxiliary records in the same colors representing similar images, the principal and auxiliary records having different density relations of their respective images substantially converging towards an extreme of said relations.

35. A photographic reproduction in colors comprising an imbibition layer containing a dye image covering the entire density range of the warmer colors, and a dye image covering the entire density range of the colder colors, and auxiliary dye images in the same colors, the two color groups of images having different density-exposure relations substantially converging towards an extreme value thereof.

36. A photograph in colors comprising partial images in fundamental colors extending over the entire density ranges of the images and partial images in substantially the same colors extending only over portions of the density ranges substantially adjacent to an extreme thereof.

37. A photograph in colors comprising principal and auxiliary images in substantially similar fundamental colors but having different density-exposure relations converging towards an extreme thereof, the auxiliary images forming with the principal images a black print.

38. A photograph in colors comprising principal and auxiliary images in substantially similar fundamental colors but having different density-exposure relations converging towards an extreme thereof, the auxiliary images forming with the principal images a black print in the higher densities of the complete positive.

39. The method of making color photographs which comprises making color separation negatives, providing from said negatives partial positives, each positive reproducing the color aspect of its negative at all densities in accordance with the object field, combining reproductions from said positives in colors corresponding to the respective negatives, and adding from said positives over the entire density range black in densities changing at a rate which increases towards one extreme thereof at a rate greater than the rate of change of density of said color reproductions.

40. The method of photographing in colors which comprises making a series of color separation records representing the fundamental color aspects of an object field, making from each record a principal reproduction element substantially representing the entire density range of its corresponding record in a color corresponding to the color range of that record, providing an auxiliary reproduction element of at least one of said records in a color corresponding to another of said records, the average gradients of the exposure-density relations of principal and auxiliary reproduction elements being inclined relatively to each other, and superposing said elements for producing a final reproduction of the object field, thereby adding from said elements a black and white reproduction having a density gradient inclined to the density gradients of the color reproductions.

41. The method of photographing in colors which comprises making a series of color separation records representing the fundamental color aspects of an object field, making from each record a principal reproduction element substantially representing its corresponding record in a color corresponding to the color range of that record, providing an auxiliary reproduction element of at least one of said records in a color corresponding to another of said records and having a density exposure relation approximately converging towards one extreme of the density exposure relation of the principal reproduction of said record, and superposing said elements for producing a substantially complete reproduction of the object field.

42. The method of photographing in colors which comprises making a series of color separation records representing the fundamental color aspects of an object field, making from each record a principal reproduction element substantially representing its corresponding record in a color corresponding to the color range of that record, providing an auxiliary reproduction element of at least one of said records in a color corresponding to another of said records having a density exposure relation of a range smaller than that of the principal reproduction of said record and approximately converging towards one extreme of the density exposure relation of said principal reproduction, and superposing said elements for producing a final reproduction of the object field.

43. The method of photographing in colors which comprises making a series of color separation records representing the fundamental color aspects of an object field, making from each record a principal reproduction element substantially representing its corresponding record in a color complementary to the color range of that record, providing an auxiliary reproduction element of at least one of said records complementary to another of said records, the average gradients of the exposure density relations of principal and auxiliary reproduction elements being inclined relatively to each other, and superposing said elements for producing a final reproduction of the object field, thereby adding from said elements a black and white reproduction having a density gradient inclined to the density gradients of the color reproductions.

44. The method of photographing in colors which comprises making a series of two color separation records representing the higher and lower wave length color aspects of an object field, making from each record a principal reproduction element substantially representing its corresponding record in a color complementary to the color range of said records, providing an auxiliary reproduction element of at least one of said records in a color complementary to the color of the other record, the average gradients of the exposure density relations of principal and auxiliary reproduction elements being inclined relatively to each other, and superposing said elements for producing a final reproduction of the object field, thereby adding from said elements a black and white reproduction having a density gradient inclined to the density gradients of the color reproductions.

45. The method of photographing in colors which comprises making a series of color separation records through filters representing the fundamental color aspects of an object field, making from each record a principal reproduction element substantially representing its corresponding record in a color of approximately the spectral range of the filter through which the corresponding record was taken, providing an auxiliary reproduction element of at least one of said records in the approximate color of a filter through which another record was taken, the average gradients of the exposure density relations of principal and auxiliary reproduction elements being inclined relatively to each other, and additively superposing said elements for producing a final reproduction of the object field, thereby adding from said elements a black and white reproduction having a density gradient inclined to the density gradients of the color reproductions.

ARTHUR BISSELL CLARK.